United States Patent [19]
Levitin et al.

[11] Patent Number: 6,053,000
[45] Date of Patent: Apr. 25, 2000

[54] REFRIGERATION UNIT

[76] Inventors: Mikhail Levitin; Boris Khaytin, both of P.O. Box 102, Reeders, Pa. 18352

[21] Appl. No.: 09/231,297

[22] Filed: Jan. 15, 1999

[51] Int. Cl.[7] .................................................. F25B 41/04
[52] U.S. Cl. .............................................. 62/205; 62/224
[58] Field of Search ........................ 62/205, 202, 222, 62/223, 224, 225

[56] References Cited

U.S. PATENT DOCUMENTS

| | | | |
|---|---|---|---|
| 2,434,593 | 1/1948 | Schulz et al. ................................. | 62/2 |
| 2,614,393 | 10/1952 | Schulz et al. ................................. | 62/2 |
| 4,879,879 | 11/1989 | Marsala et al. ............................ | 62/202 |
| 5,056,329 | 10/1991 | Wilkinson ................................. | 62/197 |
| 5,177,972 | 1/1993 | Sillato et al. ............................... | 62/205 |
| 5,182,920 | 2/1993 | Matsuoka et al. ......................... | 62/206 |
| 5,195,331 | 3/1993 | Zimmern et al. ........................... | 62/202 |
| 5,547,126 | 8/1996 | Bogrand et al. ......................... | 236/92 B |
| 5,921,098 | 7/1999 | Schmidt et al. ........................... | 62/202 |

*Primary Examiner*—Henry Bennett
*Assistant Examiner*—Marc Norman

[57] ABSTRACT

The present invention consists of a refrigeration unit with an adjusting valve that functions to control the flow of refrigerant and which is installed between the condenser and the evaporator. The adjusting valve is modulated by a controller that adjusts the refrigerant flow from the condenser to the evaporator, depending upon the outflow refrigerant vapor pressure coming from the compressor, condenser, or evaporator. Thus, substantial energy losses are avoided.

3 Claims, 3 Drawing Sheets

REFRIGERATION UNIT

INTRODUCTION

The present invention relates to refrigeration equipment and, more precisely, to the refrigeration units, including the means for controlling the flow of the refrigerant.

BACKGROUND OF THE INVENTION

As is well known, refrigerating units, such as those used for refrigeration or air conditioning, are comprised of a compressor that compresses the refrigerant vapor. The vapor is then cooled and condensed by means of contacting with a so-called "hot source" (less hot than the gas coming from the compressor) and the pressure of the condensed fluid is then decreased by means of an expansion valve down to a pressure low enough to enable the vaporization of the fluid which then comes into contact with the so-called "cold source." Thereafter, the vaporized gas is returned to the compressor. During its vaporization, the fluid absorbs heat from the cold source, thus creating the desired refrigerating effect.

This type of unit needs to be controlled so as to avoid two drawbacks. Firstly, if the amount of heat available at the cold sources is low, large quantities of residual liquid may be returned to the compressor. The result of this would be damage to the compressor and waste of energy in the unit. Secondly, if the amount of heat available at the cold source is excessive, the rate of the liquid flow arriving at the evaporator may not be high enough to maintain the cold source at the desired low temperature level. When the amount of heat available at the cold source is excessive, the motor of the compressor would be damaged because of overloading.

In order to achieve the required regulation or control, it is known that the evaporator is controlled by the use of a thermal expansion valve with a bulb partially filled with liquid (generally the same liquid as the fluid used in the refrigerating circuit).

The use of the thermal expansion valve cannot provide safe utilization of the unit when the amount of heat available at the cold source is excessive. When used in this scenario, the thermal expansion valve promotes substantial energy losses. An attempt to overcome this drawback was made in the U.S. Pat. No. 5,195,331 by Zimmern et al, Mar. 23, 1993. According to this invention, the bubble of the expansion valve is heated by a resistor and mounted in the discharge pipe of the evaporator. In the absence of droplets of liquid refrigerant in the flow through the discharge pipe, e.g. when the refrigerant flow rate tends to become too low with respect to the cold demand, the resistor heats up the fluid in the bulb, and the pressure in the bulb increases and moves the expansion valve to a more opened position. As soon as droplets hit the bulb in the discharge pipe, said droplets cool down the bulb despite the heating effect of the resistor and the expansion valve is moved to a more closed position. The disadvantage of this solution is that it does not allow proper working of the refrigerant unit when the amount of heat available at the cold source is excessive, and in this situation, it promotes substantial energy losses.

In conclusion, a need exists for improving the refrigeration unit when the amount of heat available at the cold source is excessive.

SUMMARY OF THE INVENTION

According to the present invention, the safe operation of the refrigerant unit when the amount of heat available at the cold source is excessive is achieved by the utilization of a device that controls the refrigerant flow through the evaporator. For example, an adjusting valve that controls the flow of refrigerant can be installed between the condenser and evaporator. This valve is modulated by a controller that compares the value of the pressure of the steam-generated refrigerant discharged from the compressor with the value assigned in the set point adjustment.

According to the second embodiment of the present invention, the controller compares the value of the pressure of liquid refrigerant discharged from the condenser with the value assigned in the set point adjustment.

According to the third embodiment of the present invention, the controller compares the value of the pressure of steam-generated refrigerant drawing off from an evaporator. If the outside temperature is high, the amount of heat available at the cold source and the evaporator is excessive. Thus, the value of the pressure of the steam-generated refrigerant discharged from the compressor, the pressure of the liquid refrigerant in the discharge line of the condenser, and the pressure of the steam-generated refrigerant in the suction line are increased as well. In this case, the safe pressure relay cuts off the compressor motor. When the proposed controller is used, the adjusting valve is closed, thereby stopping the refrigerant flow if, for example, the pressure of the steam-generated refrigerant in the discharge line of the compressor is increased. When the temperature of the evaporator becomes lower in time, this pressure is decreased and the controller opens the adjusting valve to continue the flow of refrigerant. In this manner, the refrigerant unit is able to operate and avoid substantial energy losses despite the excessive level of heat available at the evaporator.

The above described and many other features and attendant advantages of the present invention will become apparent as the invention becomes better understood by referring to the following detailed description when considered in conjunction with the accompanying drawings.

DESCRIPTION OF THE DRAWINGS

Detailed descriptions of the preferred embodiment of the invention will be made with reference to the accompanying drawings.

DETAILED DESCRIPTION OF THE DRAWINGS

The following is a detailed description of the best presently known mode of carrying out the invention. This description is not to be taken in a limiting sense but is made merely for the purpose of illustrating the general principles of the invention. The scope of the invention is defined by the appended claims.

Figure 1:
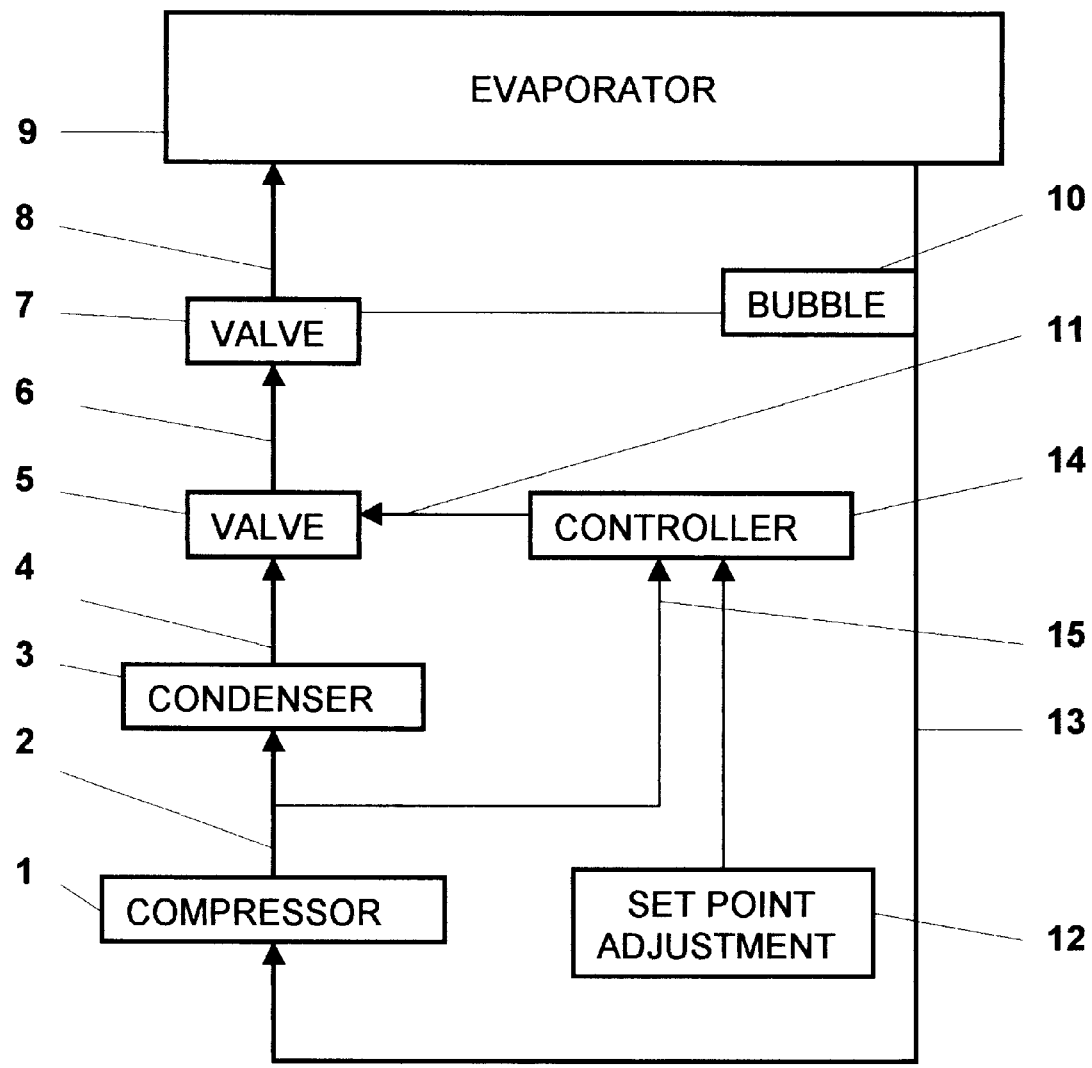
FIG. 1 shows a block diagram of the refrigerant unit in accordance with the preferred embodiment of the present invention.

The refrigerant unit (see FIG. 1) is comprised of a compressor 1, a condenser 3 connected by pipe 2 to said compressor 1, an adjusting valve 5 connected by pipe 4 to said condenser 3, a thermal expansion valve 7 (with a bubble 10 installed on suction line 13) connected by pipe 6 to said adjusting valve 5, an evaporator 9 connected by pipe 8 to said thermal expansion valve 7 and connected to said compressor 1 by said suction line 13, a controller 14 connected by pipe 15 to said pipe 2 and connected with said adjusting valve 5 by means of link 11.

The steam-generated refrigerant is drawn from the evaporator 9 to the compressor 1 by suction line 13. The compressed steam-generated refrigerant is drawn to condenser 3 by pipe 2 where it is converted to liquid. The liquid refrigerant from condenser 3 is drawn to the evaporator 9 through the following successive connections: via pipe 4 to adjusting valve 5, via pipe 6 to thermal expansion valve 7, via pipe 8 to evaporator 9. The thermal expansion valve 7 reduces the pressure of the liquid refrigerant before it is introduced into evaporator 9. The refrigerant flow to the evaporator 9 is altered when there exists a variable difference between the pressure of the steam-generated refrigerant discharged from the compressor 1 by pipe 15 and channeled to the controller 14 and that of the assigned needed value of the pressure established in the set point adjustment 12. The controller 14 closes the adjusting valve 5 to stop the refrigerant flow if the pressure of the steam-generated refrigerant in the discharge line of the compressor for example, is increased over the value in set point adjustment 12. After the temperature of the evaporator becomes lower in time, this pressure is decreased and the controller 14 opens the adjusting valve 5 to continue the flow of the refrigerant. Thusly, the work of a refrigerant unit is provided and substantial energy losses are avoided despite the excessive heat present at the evaporator.

Figure 2:
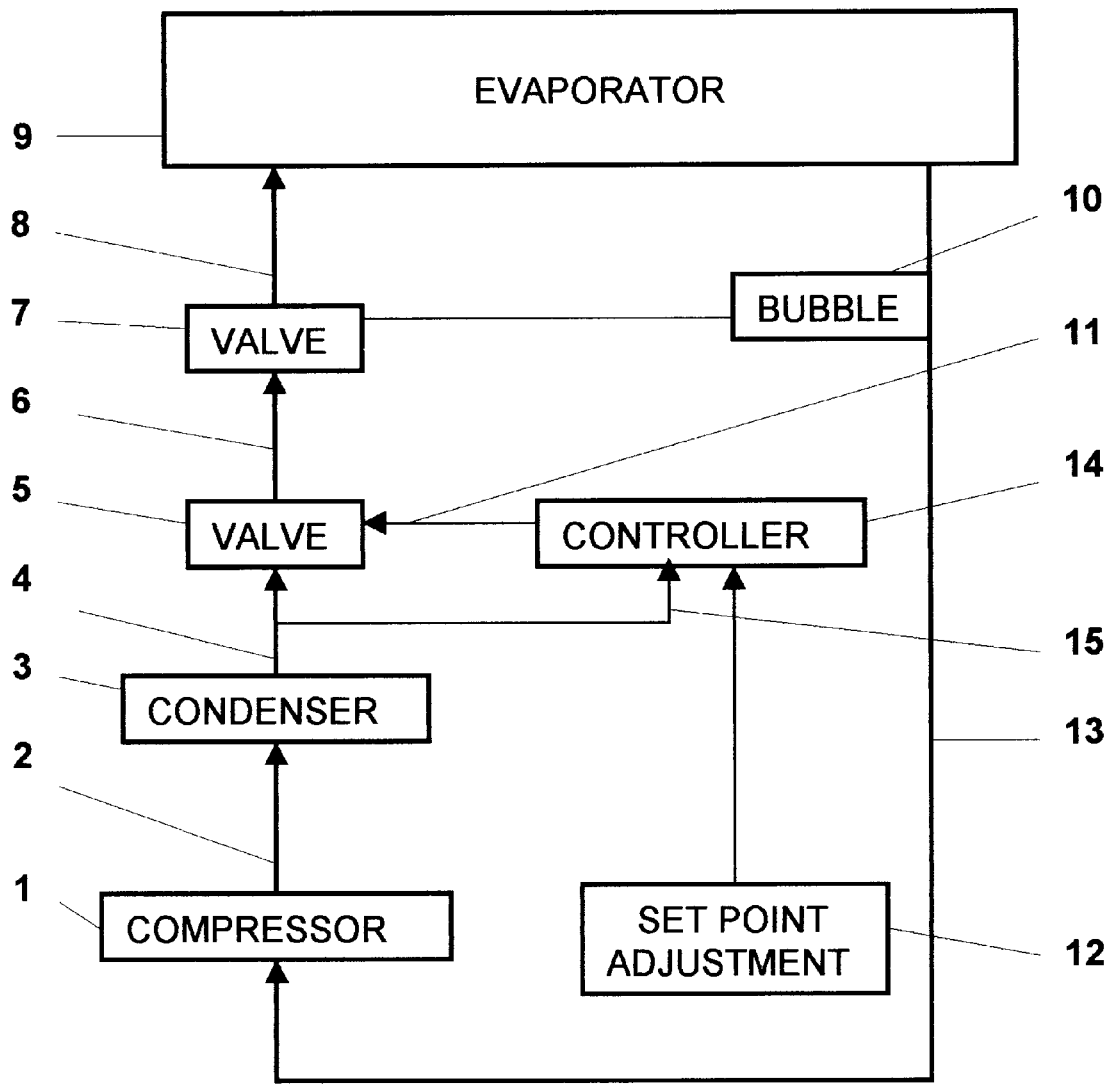
FIG. 2 shows a block diagram in accordance with the second embodiment of the present invention with the controller which senses the pressure value of the liquid refrigerant discharged from the condenser and which is connected to the pipe carrying the liquid refrigerant.

According to the second embodiment of the present invention, the refrigerant unit (see FIG. 2) is comprised of a compressor 1, a condenser 3 connected by pipe 2 to said compressor 1, an adjusting valve 5 connected by pipe 4 to said condenser 3, a thermal expansion valve 7 (with a bubble 10 installed on suction line 13) connected by pipe 6 to said adjusting valve 5 an evaporator 9 connected by pipe 8 to said thermal expansion valve 7 and connected to said compressor 1 by said suction line 13, a controller 14 connected by pipe 15 to said pipe 4 and connected with said adjusting valve 5 by means of link 11.

The steam-generated refrigerant is drawn from the evaporator 9 to the compressor 1 by suction line 13. The compressed steam-generated refrigerant is drawn to condenser 3 by pipe 2 where it is converted to liquid. The liquid refrigerant from condenser 3 is drawn to the evaporator 9 through the following successive connections: via pipe 4 to adjusting valve 5, via pipe 6 to thermal expansion valve 7, via pipe 8 to evaporator 9. The thermal expansion valve 7 reduces the pressure of the liquid refrigerant before it is introduced into evaporator 9. The refrigerant flow to the evaporator 9 is altered when there exists a variable difference between the pressure of the liquid refrigerant discharged from the condenser 3 by pipe 15 and channeled to the controller 14 and that of the assigned needed value of the pressure established at the set point adjustment 12. The controller 14 closes the adjusting valve 5 to stop the refrigerant flow if the pressure of the steam-generated refrigerant in the discharge line of the compressor, for example, is increased over the value assigned in adjustment 12. After the temperature of the evaporator becomes lower in time, this pressure is decreased and the controller 14 opens the adjusting valve 5 to continue the flow of the refrigerant. Thusly, the work of a refrigerant unit is provided and substantial energy losses are avoided despite the excessive heat present at the evaporator.

Figure 3:
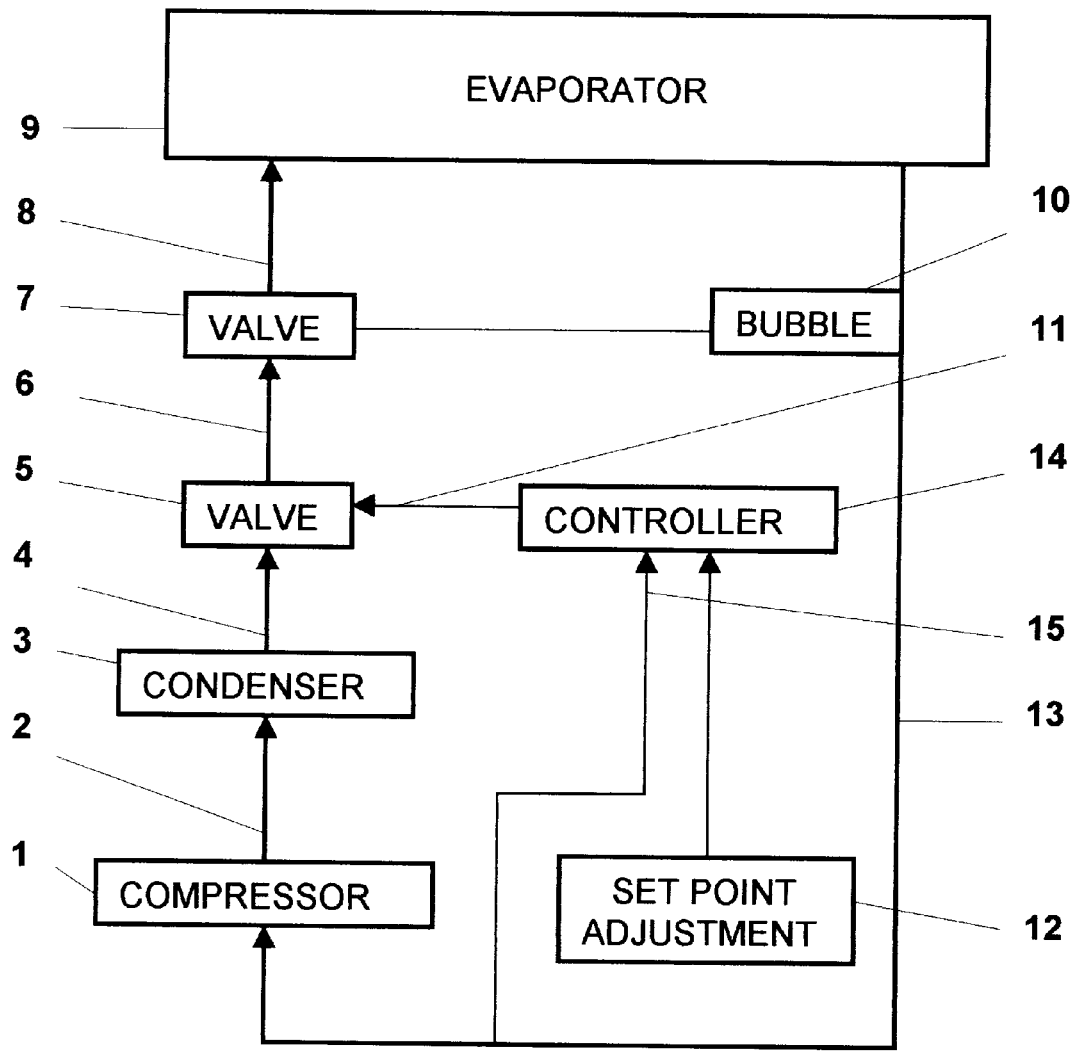
FIG. 3 shows a block diagram in accordance with the third embodiment of the present invention with the controller which senses the pressure value of the steam-generated refrigerant discharging from the evaporator and which is connected to the pipe carrying steam-generated refrigerant.

According to the third embodiment of the present invention, the refrigerant unit (see FIG. 3) is comprised of a compressor 1, a condenser 3 connected by pipe 2 to said compressor 1, an adjusting valve 5 connected by pipe 4 to said condenser 3, a thermal expansion valve 7 (with a bubble 10 installed on suction line 13) connected by pipe 6 to adjusting valve 5, an evaporator 9 connected by pipe 8 to said thermal expansion valve 7 and connected to said compressor 1 by said suction line 13, a controller 14 connected by pipe 15 to said suction line 13 and connected with said adjusting valve 5 by means of link 11.

The steam-generated refrigerant is drawn from the evaporator 9 to the compressor 1 by suction line 13. The compressed steam-generated refrigerant is drawn to condenser 3 by pipe 2 where it is converted to liquid. The liquid refrigerant from condenser 3 is drawn to the evaporator 9 through the following successive connections: via pipe 4 to adjusting valve 5, via pipe 6 to thermal expansion valve 7, via pipe 8 to evaporator 9. The thermal expansion valve 7 reduces the pressure of the liquid refrigerant before it is introduced into evaporator 9. The refrigerant flow to the evaporator 9 is altered when there exists a variable difference between the pressure of the steam-generated refrigerant discharged from the evaporator 9 by pipe 15 and channeled to the controller 14 and that of the assigned needed value of the pressure established at set point adjustment 12.

The controller 14 closes the adjusting valve 5 to stop the refrigerant flow if the pressure of the steam-generated refrigerant in the discharge line of the compressor, for example is increased over the value assigned in adjustment 12. After the temperature of the evaporator becomes lower in time, this pressure is decreased and the controller 14 opens the adjusting valve 5 to continue the flow of the refrigerant. Thusly, the work of a refrigerant unit is provided and substantial energy losses are avoided despite the excessive heat present at the evaporator.

Although the present invention has been described in terms of the preferred embodiments above numerous modifications and/or additions to the above-described preferred embodiments would be readily apparent to one skilled in the art. It is intended that the scope of the present invention extends to modifications and/or additions and that the scope of the present invention is limited solely by the claims set forth below.

We claim:

1. A refrigerant unit, comprising of a compressor, a condenser connected by a pipe to said compressor, an adjusting valve connected by a pipe to said condenser, a thermal expansion valve (with a bubble installed on a suction line) connected by a pipe to said adjusting valve, an evaporator connected by a pipe to said thermal expansion valve and to said compressor by said suction line, a controller connected by a pipe to the exit of said compressor and connected with said adjusting valve by means of a link.

2. The refrigerant unit is, comprising a compressor, a condenser connected by a pipe to said compressor, an adjusting valve connected by a pipe to said condenser, a thermal expansion valve (with a bubble installed on a suction line) connected by a pipe to said adjusting valve, an evaporator connected by a pipe to said thermal expansion valve and to said compressor by said suction line, a controller connected by a pipe to the exit of said condenser and connected with said adjusting valve by means of a link, said controller adjusting said adjusting valve based on a refrigerant pressure detected along the discharge line of the compressor.

3. A refrigerant unit, comprising a compressor, a condenser connected by a pipe to said compressor, an adjusting valve connected by a pipe to said condenser, a thermal expansion valve (with a bubble installed on a suction line) connected by a pipe to said adjusting valve, an evaporator connected by a pipe to said thermal expansion valve and to said compressor by said suction line, a controller connected by a pipe to the exit of said evaporator and connected with said adjusting valve by means of a link.

* * * * *